United States Patent
Opferman et al.

(10) Patent No.: US 10,877,751 B2
(45) Date of Patent: Dec. 29, 2020

(54) SPOOFING A PROCESSOR IDENTIFICATION INSTRUCTION

(71) Applicant: Intel Corporation, Santa Clara, CA (US)

(72) Inventors: Toby Opferman, Beaverton, OR (US); Russell C. Arnold, Fountain Hills, AZ (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 16/147,699

(22) Filed: Sep. 29, 2018

(65) Prior Publication Data

US 2020/0104128 A1    Apr. 2, 2020

(51) Int. Cl.
*G06F 9/30*    (2018.01)
*G06F 9/455*    (2018.01)

(52) U.S. Cl.
CPC ...... *G06F 9/30003* (2013.01); *G06F 9/30076* (2013.01); *G06F 9/30145* (2013.01); *G06F 9/45508* (2013.01)

(58) Field of Classification Search
CPC .................. G06F 9/30003; G06F 9/30076
See application file for complete search history.

(56) References Cited

U.S. PATENT DOCUMENTS

| 2009/0070760 | A1* | 3/2009 | Khatri | G06F 9/45558 718/1 |
| 2009/0172357 | A1* | 7/2009 | Puthiyedath | G06F 9/30003 712/208 |
| 2017/0212774 | A1* | 7/2017 | Cerny | G06F 9/45508 |

OTHER PUBLICATIONS

AMD, "Live Migration with AMD-V(trademark) Extended Migration Technology", Advanced Micro Devices, Rev. 3.00, Apr. 2008, pp. 1-17.
European Search Report and Search Opinion, EP App. No. 19182745.0, Dec. 16, 2019, 12 pages.
Serebrin, Ben, "Cross-vendor migration: What do you mean my ISA isn't compatible?", CPU Virtualization Architect, AMD, Xen Summit, Feb. 2009, 4 pages.

* cited by examiner

*Primary Examiner* — Jacob Petranek
(74) *Attorney, Agent, or Firm* — Nicholson De Vos Webster & Elliott LLP

(57) ABSTRACT

Embodiments of processors, methods, and systems for a processor core supporting processor identification instruction spoofing are described. In an embodiment, a processor includes an instruction decoder and processor identification instruction spoofing logic. The processor identification spoofing logic is to respond to a processor identification instruction by reporting processor identification information from a processor identification spoofing data structure. The processor identification spoofing data structure is to include processor identification information of one or more other processors.

16 Claims, 9 Drawing Sheets

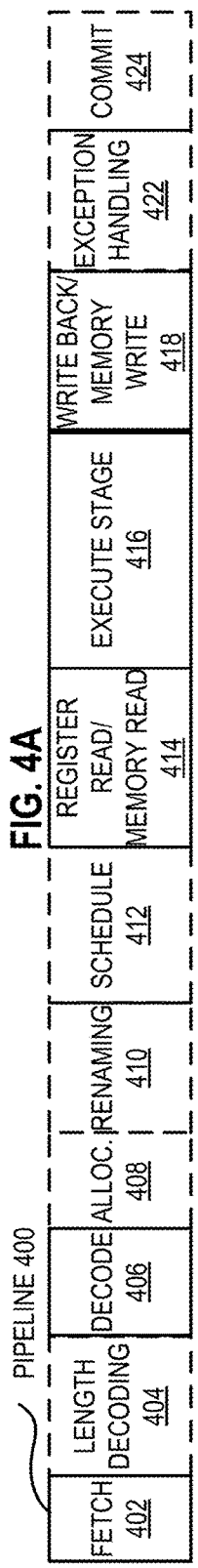
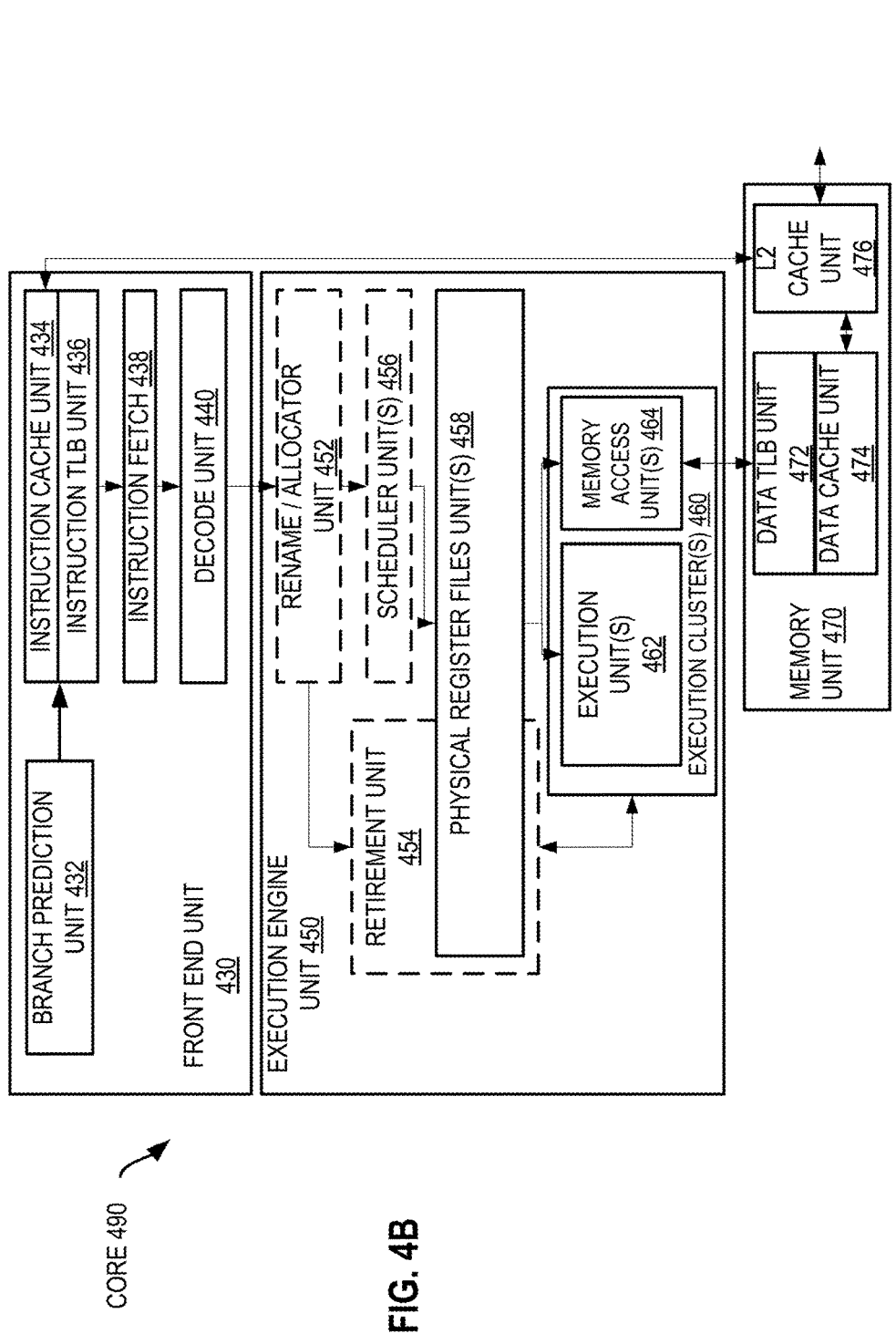
FIG. 4A
FIG. 4B

SPOOFING A PROCESSOR IDENTIFICATION INSTRUCTION

FIELD OF INVENTION

The field of invention relates generally to computer architecture, and, more specifically, but without limitation, to processor core design.

BACKGROUND

A computer system may include multiple processors and/or processor cores, each having an instruction set architecture (ISA) according to which it executes instructions issued or provided to it and/or the system by software, including application and/or user-level software, system software (e.g., an operating system (OS), virtual machine monitor (VMM), hypervisor, etc.), and/or any other software, program, code, etc.

The ISA of a processor may include a processor identification instruction (e.g., CPUID), the execution of which may include reporting identification information about the processor.

BRIEF DESCRIPTION OF THE DRAWINGS

The present invention is illustrated by way of example and not limitation in the figures of the accompanying drawings, in which like references indicate similar elements and in which:

FIG. 4A is a block diagram illustrating both an exemplary in-order pipeline and an exemplary register renaming, out-of-order issue/execution pipeline according to embodiments of the invention;

FIG. 4B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
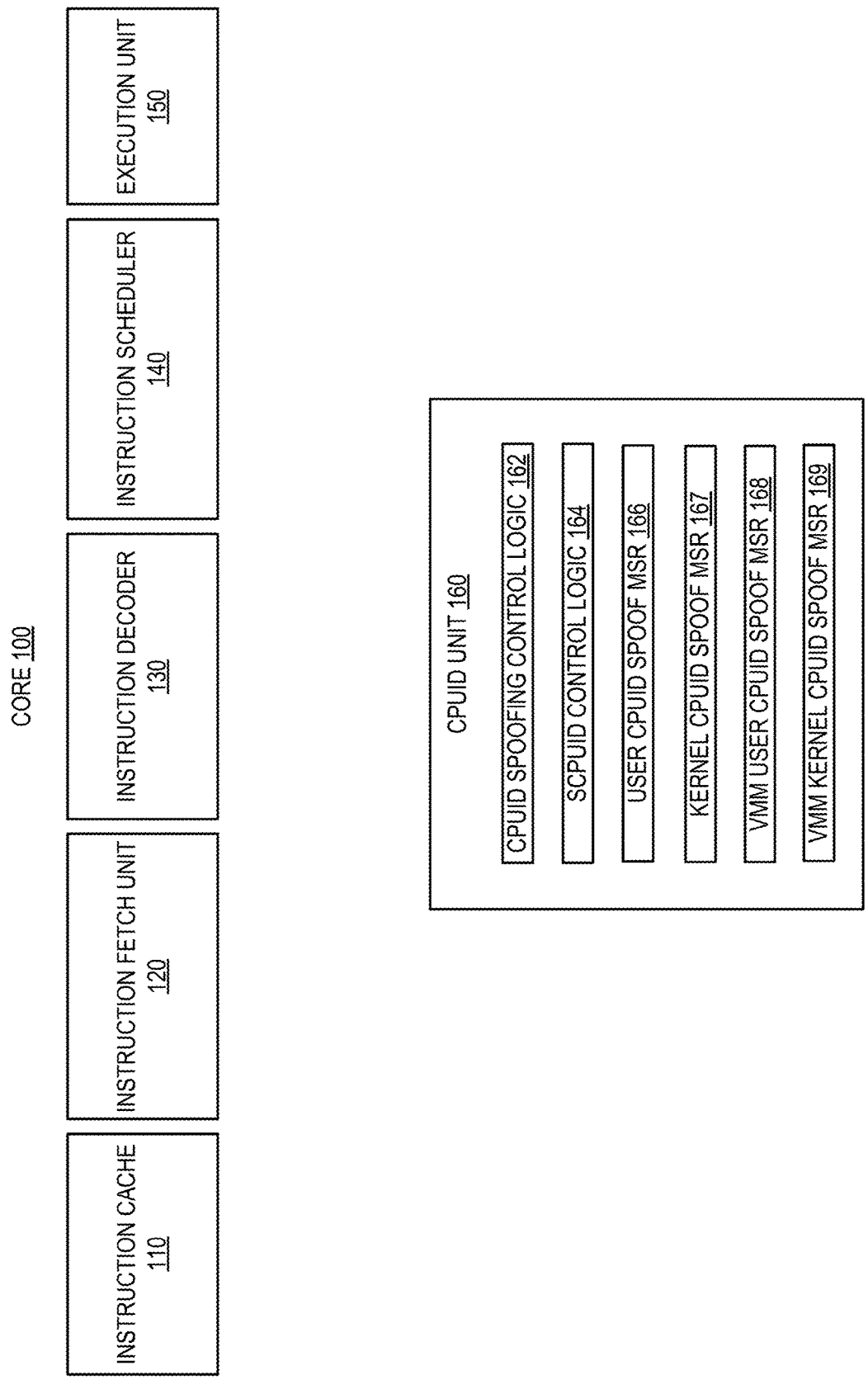
FIG. 1 is a diagram illustrating a processor core according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As discussed in the background section, a computer system may include multiple cores, each having an instruction set architecture (ISA) according to which it executes instructions issued or provided to it and/or the system by software. In this specification, the use of the term "instruction" is meant to refer to this type of instruction (which may also be called a macro-instruction or an ISA-level instruction), as opposed to: (1) a micro-instruction or micro-operation that may be provided to execution and/or scheduling hardware as a result of the decoding (e.g., by a hardware instruction-decoder) of a macro-instruction, and/or (2) a command, procedure, routine, subroutine, or other software construct, the execution and/or performance of which involves the execution of multiple ISA-level instructions.

In some such systems, different cores may have different ISAs. Therefore, a system may include a first core with hardware, hardwiring, microcode, control logic, and/or other micro-architecture designed to execute particular instructions according to a particular ISA (or extensions to or other subset of an ISA), and the system may also include a second core without such micro-architecture. In other words, the first core may be capable of executing those particular instructions without any translation, emulation, or other conversion of the instructions (except the decoding of macro-instructions into micro-instructions and/or micro-operations), whereas the second core is not. In that case, that particular ISA (or extensions to of subset of an ISA) may be referred to as supported (or natively supported) by the first core and unsupported by the second core, and/or the system may be referred to as having a heterogeneous ISA.

It may be desirable for a processor or processor core to have the capability to spoof the execution of a processor identification instruction (to be referred to as a CPUID instruction) by reporting information based on a different core. For example, in a system (including a system-on-a-chip or SOC) with a heterogeneous ISA or any other multiprocessor or multicore system, embodiments of the present invention may enable a core to report identification information based a union, intersection, or any other superset, subset, or combination of the information of two or more cores in the system. Therefore, embodiments of the invention may include system software (including an OS, VMM, hypervisor, or emulator) configuring and/or using CPUID spoofing according to embodiments to manage the operation of system, for example, by presenting to software, such as drivers, application software, and guest software (software operating within a virtual machine), an abstraction or virtualization of physical system. For example, in a system with a heterogeneous ISA, some applications may benefit and/or be developed to benefit (e.g., improve their functionality and/or performance on the system, whether aware or unaware if or that they are running on a heterogeneous ISA system) from exposure to the maximum ISA, the minimum ISA, the native ISA of the core executing the CPUID instruction, or some other combination of the cores' ISAs. In this specification, references to CPU spoofing may be interpreted to mean CPU spoofing according to any one or more embodiments of the invention.

FIG. 1 is a diagram illustrating a core according to an embodiment of the invention. Core 100 in FIG. 1 may be implemented in logic gates and/or any other type of circuitry, all or parts of which may be included in a discrete component and/or integrated into the circuitry of a processing device or any other apparatus in a computer or other information processing system. For example, core 100 in FIG. 1 may correspond to or be included in any of core 490 in FIG. 4B, cores 502A to 502N in FIG. 5, processors 610 and 615 in FIG. 6, processors 770 and 780 in FIGS. 7 and 8, and/or cores 902A to 902N in FIG. 9, each as described below.

Core 100 includes instruction cache 110, instruction fetch unit 120, instruction decode unit 130, instruction scheduler 140, and execution unit 150. Core 100 may include any number of each of these elements (e.g., multiple execution units) and/or any other elements not shown in FIG. 1. Furthermore, embodiments of the invention may exclude elements shown in FIG. 1 (e.g., a core according to an embodiment may be implemented without an instruction cache).

Instruction cache 110 may represent and/or include a memory to store instructions to be decoded and/or executed by core 100. Instruction fetch unit 120 may represent and/or include instruction fetch circuitry and/or hardware to fetch instructions (e.g., from instruction cache 110) to be decoded and/or executed by core 100. Instruction decode unit 130 may represent and/or include the circuitry and/or hardware of an instruction decoder. Instruction scheduler 140 may represent and/or include circuitry and/or hardware to schedule instructions for execution by core 100. Execution unit 150 may represent and/or include circuitry and/or hardware to execute instructions. Further description of each of these elements may be found in the descriptions of corresponding elements in the processor and/or system embodiments described below.

In an embodiment of the invention, core 100 also includes CPUID unit 160 to provide for core 100 to execute a CPUID instruction according to an embodiment of the invention. CPUID unit 160 may include CPUID spoofing control logic 162, which may represent and/or include hardwired control logic, programmable control logic, microcode, firmware, and/or hardware to control the operation of core 100 in response to CPUID instructions according to embodiments of the invention. CPUID unit 160 may include SCPUID control logic 164, which may represent and/or include hardwired control logic, programmable control logic, microcode, firmware, and/or hardware to control the operation of core 100 in response to a CPUID spoofing setup instruction (to be referred to as SCPUID) according to embodiments of the invention. Although CPUID spoofing control logic 162 and SCPUID control logic 164 are shown conceptually as within a CPUID unit 160, either or both may be included in and/or share any other logic, circuitry, and/or hardware within core 100.

In embodiments, core 100 (e.g., CPUID spoofing control logic 162) may refer to CPUID spoofing configuration information, which may be stored in any storage location(s) accessible to core 100, such as registers (illustrated in FIG. 1 as native CPUID spoof registers 166 and 167 and VMM CPUID spoof registers 168 and 169) or other memory or storage within core 100, memory or storage external to core 100, or any portion or combination thereof. Any such registers may be any type of register (e.g., control, configuration, model-specific, machine-specific, etc., where model-specific and/or machine-specific registers may be referred to as MSRs).

In embodiments, a CPUID instruction may have leafs and/or subleafs that may enumerate or otherwise relate to a type, category, or other subset of the identifying and/or feature information of a processor. For convenience, unless otherwise described, references in this specification to a CPUID instruction may refer to a leaf or subleaf of a CPU instruction.

In embodiments, a CPUID instruction may be used to determine whether a core supports CPUID spoofing. For example, the information to be enumerated with a CPUID instruction may include a native CPUID spoofing support indicator and a VMM CPUID spoofing support indicator, and core 100 may be hardwired or configured to respond to a CPUID instruction by reporting (e.g., with a value of '1' for the native CPUID spoofing support indicator) that it supports CPUID spoofing when software is running in a native mode (e.g., a mode in which the software is running in a native, root, bare metal, or other mode without a VMM, hypervisor, or other system virtualization software between the software and the hardware) and/or by reporting (e.g., with a value of '1' for the VMM CPUID spoofing support indicator that it supports CPUID spoofing when software is running in a virtualized mode (e.g., a mode in which the software is running in a non-native, non-root, virtual machine, or other mode with a VMM, hypervisor, or other system virtualization software between the software and the hardware).

As further described below, CPUID spoofing configuration may be used to control how core 100

In embodiments, core 100 may be configured whether and/or how to perform CPUID spoofing, for example, using CPUID spoofing configuration information. This CPUID spoofing configuration information may include two groups of information: native and VMM.

Core 100 may control CPUID spoofing using the native configuration information when in a native mode (e.g., as described above). The registers (e.g., MSR 166 for user mode and MSR 167 for kernel mode, as set forth, for example in Table 1 below) storing native configuration information may be writable and/or accessible only to system software and/or software running at a more privileged level than that of application or user software.

Core 100 may control CPUID spoofing using the VMM configuration when in a virtualized mode (e.g., as described above). The registers (e.g., MSR 168 for user mode and MSR 169 for kernel mode, as set forth, for example in Table 5 below)) storing VMM configuration information may be writable and/or accessible only to a VMM, hypervisor, or other software controlling a virtualized environment.

Note that it is possible for both types (native and VMM) of configuration information to apply during execution of guest software on a VM. For example, a VMM may configure the VMM configuration MSR to control CPUID spoofing within a VM, transfer control (e.g., VM entry) to a guest OS running in the VM, then the guest OS, unaware that is operating within a VM, may configure the native configuration MSR to control CPUID spoofing by a guest application. In this case, the guest application may execute the CPUID instruction according to the native configuration information, as if it was running in a native mode (when it is actually running in an abstraction of a native mode and the information reported would be that of the abstracted machine rather than the actual physical machine), unless the native configuration was overridden by the VMM configuration information (e.g., by a setting that caused a VM exit). Note also that in this situation, when the VMM is running, only the native configuration information would apply (assuming non-nested virtualization).

For example, an operating system, after determining that core 100 supports CPUID spoofing, may set and/or store native CPUID spoofing configuration information to provide for control of CPUID spoofing in native mode. Table 1 is an example of control and/or configuration information for native CPUID spoofing.

TABLE 1

| MSR | Bit(s) | Description | Values |
|---|---|---|---|
| User_CPUID_Spoof | 0 | Enable or disable spoofing CPUID in user mode | 0 - disable (report native CPUID information) 1 - enable spoofing |
| User_CPUID_Spoof | 1 | Allow native CPUID to be read by setting a designated indicator (e.g., bit 30 of the CPUID leaf) in user mode | 0 - disable reading native CPUID mechanism 1 - enable reading native CPUID mechanism |
| User_CPUID_Spoof | 2 | Specifies the address type of the User CPUID Table Address | 0 - Virtual Address 1 - Physical Address (may be a guest physical address (GPA) if in a VM) |
| User_CPUID_Spoof | 11:3 | Reserved | |
| User_CPUID_Spoof | 63:12 | Address of the CPUID User Mode spoofing table | Virtual or Physical address |
| Kernel_CPUID_Spoof | 0 | Enable or disable spoofing CPUID in kernel mode | 0 - disable (report native CPUID information) 1 - enable spoofing |
| Kernel_CPUID_Spoof | 1 | Allow native CPUID to be read by setting a designated indicator (e.g., bit 30 of the CPUID leaf) in kernel mode | 0 - disable reading native CPUID mechanism 1 - enable reading native CPUID mechanism |
| Kernel_CPUID_Spoof | 2 | Specifies the address type of the User CPUID Table Address | 0 - Virtual Address 1 - Physical Address (may be a guest physical address (GPA) if in a VM) |
| Kernel_CPUID_Spoof | 11:3 | Reserved | |
| Kernel_CPUID_Spoof | 63:12 | Address of the CPUID Kernel Mode spoofing table | Virtual or Physical address |

In Table 1 (and Table 6 below), terms may be used for conciseness and/or convenience rather than as limitations. For example, the use of the terms "User Mode" and "Kernel Mode" is intended to mean a relative ordering of modes, privilege levels, privilege rings, etc., in which some software (application, user, etc.) runs with less privilege than other software (kernel, supervisor, system, etc.). In embodiments, the address of the user mode spoofing table and the kernel mode spoofing table may be the same (e.g., the same spoofing table is used in both modes).

The settings and associated memory locations of the CPUID spoofing configuration information (native and/or VMM) may be saved for context switching using state management instructions (e.g., XSAVES) to provide for selectively performing CPU spoofing (e.g., performing CPU spoofing based on which application is running). In embodiments (e.g., if memory management software uses CPUID), CPUID spoofing configuration information may be stored in pinned memory to avoid page faults.

Figure 2:
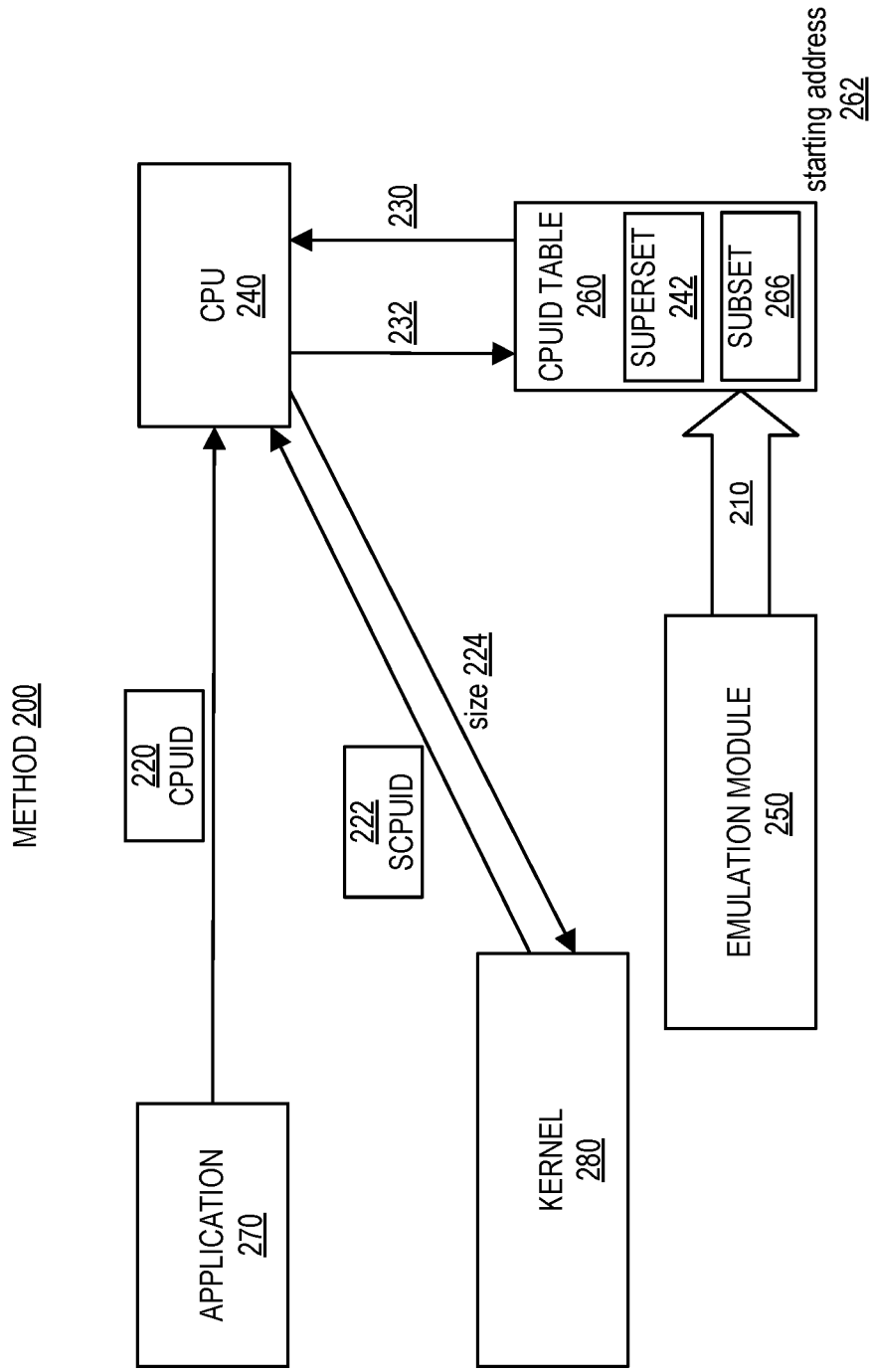
FIG. 2 is a diagram illustrating a method 200 of processor identification instruction spoofing according to an embodiment of the invention.

FIG. 2 illustrates a method 200 of CPUID spoofing according to an embodiment of the invention. In 210, a CPUID table 260 is constructed, as described below. In 220, a CPUID instruction is issued (e.g., by an application 270) to a processor 240 (which may also be referred to as a central processing unit or CPU or a core). In 230, the core accesses the CPUID table to provide information with which to respond to the CPUID instruction.

Construction of a CPUID table (as in 210), may be performed in various ways and include various information according to embodiments of the invention. For example, a CPUID table may be constructed in preparation for a CPUID instruction, in response to a CPUID instruction, or in response to a first CPUID instruction to be re-used in response to a subsequent CPUID instruction. For example, a CPUID table may include information that represents any superset 264, set, or subset 266 of the information of two or more cores (e.g., the union or maximum set of the ISAs of all cores in a system or SOC, the intersection or minimum set of the ISAs of all cores in a system or SOC, etc.).

In embodiments, one or more CPUID tables may be constructed and/or used to provide for a core to selectively respond to CPUID instructions. For example, an OS on a core may determine, based on which application issues a CPUID instruction and/or a setting of a CPUID spoof enable field (see Table 1), whether the core is to access a first CPUID table to respond with CPUID information corresponding to the maximum ISA, access a second CPUID table to respond with CPUID information corresponding to the minimum ISA, respond with the native ISA of the core (which may be performed without accessing a CPUID table, etc. In embodiments, multiple supersets, sets, and/or subsets of information may be contained in and accessed separately from a single table, thus the accesses to "a first CPUID table" and "a second CPUID table" in the preceding example may be realized by accessing a single CPUID table containing both the maximum set and the minimum set.

In embodiments, construction of a CPUID table may be performed by an emulation module 250 (e.g., invoked by an operating system or kernel 280). For example, an emulation module may include multiple CPUID instructions to query multiple cores, along with instructions to form any desired superset, set, or subset of the information reported by the cores, and to store that superset, set, or subset in the CPUID table.

In embodiments, construction of a CPUID table may be performed by an operating system or kernel 280 (e.g., without invoking an emulation module as described above). For example, a core may support an SCPUID instruction 222, as described below, that may be used in the construction of a CPUID table.

In an embodiment, a core, in response to an SCPUID instruction, stores 232 its native CPUID information starting at a memory address 262 specified by the instruction (e.g., at a virtual address stored in RAX), or, in response to a SCPUID instruction issued with a designated value (e.g., '0' instead of or as the memory address), returns the size 224 of a memory space needed for its native CPUID information. Therefore, the following pseudocode may be used by an OS to create a CPUID table (additional code may include additional SCPUID instructions issued to additional cores to complete the CPUID table with the desired set(s) of information from multiple cores).

XOR RAX, RAX
   SCPUID
   MOV RCX, RAX
   CALL malloc
   TEST RAX, RAX
   JZ @Failure_To_Allocate
   SCPUID In embodiments, the SCPUID instruction may be intercepted by a VMM if executed by guest software operating in a virtual machine, so that the VMM may collect information reflecting the physical system rather than the virtual machine (VM). For example, when a core is configured to exit a VM in response to a CPUID instruction, an SCPUID instruction may also cause a VM exit.

Table 2 is an example of a format for information in a CPUID table.

TABLE 2

| Field | Size | Description |
| --- | --- | --- |
| Number of Leaf Sets | 4 Bytes | The number of sets of leafs that follow. The sets of leafs start from the highest range to the lowest range. |
| Start Leaf | 4 Bytes | The start leaf number. |
| Leaf Offset | 8 Bytes | Offset to where these leafs start. |
| ... | ... | ... |
| Start Leaf | 4 Bytes | The start leaf number. |
| Leaf Offset | 8 Bytes | Offset to where these leafs start. |

Embodiments may include flags used to determine how a CPUID table is constructed. For example, a flag may indicate whether subleafs are supported in the corresponding range. In an embodiment including cores having an x86 architecture, Table 3 is an example in which subleafs are not used, Table 4 is an example in which subleafs are used, and Table 5 is an example in which only flags are used.

TABLE 3

| Field | Size | Description |
| --- | --- | --- |
| Flags | 4 Bytes | Bit 0 would be '0' to indicate no subleafs are used. Bit 1 would be '0' to indicate this range is not flags only |
| Number of Leafs | 4 Bytes | Number of Leafs |
| EAX $1^{st}$ Leaf | 4 Bytes | EAX Value |
| EBX $1^{st}$ Leaf | 4 Bytes | EBX Value |
| ECX $1^{st}$ Leaf | 4 Bytes | ECX Value |
| EDX $1^{st}$ Leaf | 4 Bytes | EDX Value |
| ... | ... | ... |
| EAX Leaf n | 4 Bytes | EAX Value |
| EBX Leaf n | 4 Bytes | EBX Value |
| ECX Leaf n | 4 Bytes | ECX Value |
| EDX Leaf n | 4 Bytes | EDX Value |

TABLE 4

| Field | Size | Description |
| --- | --- | --- |
| Flags | 4 Bytes | Bit 0 would be '1' to indicate subleafs are used. Bit 1 would be '0' to indicate this range is not flags only |
| Number of Leafs | 4 Bytes | Number of Leafs |
| Number of Subleafs for $1^{st}$ Leaf | 4 Bytes | Number of subleafs |
| Offset for $1^{st}$ Leaf | 8 Bytes | Offset to the subleaf list |
| ... | ... | ... |
| Number of Subleafs for n Leaf | 4 Bytes | Number of subleafs for leaf n |
| Offset for n Leaf | 8 Bytes | Offset to the subleaf list for leaf n |

In Table 4, the offsets may be relative to the start of the table; therefore, the table may be configured using either virtual or physical addresses.

TABLE 5

| Field | Size | Description |
|---|---|---|
| Flags | 4 Bytes | Bit 0 would be ignored (because Bit 1 is '1') Bit 1 would be '1' to indicate this range is flags only (e.g., this table is bypassed for this range and either (i) in native mode, either native CPUID is read or a VM exit will occur (depending on configuration settings as in Tables 1 and/or 6), or (ii) in virtualized mode, a VM exit will occur |

Figure 3:
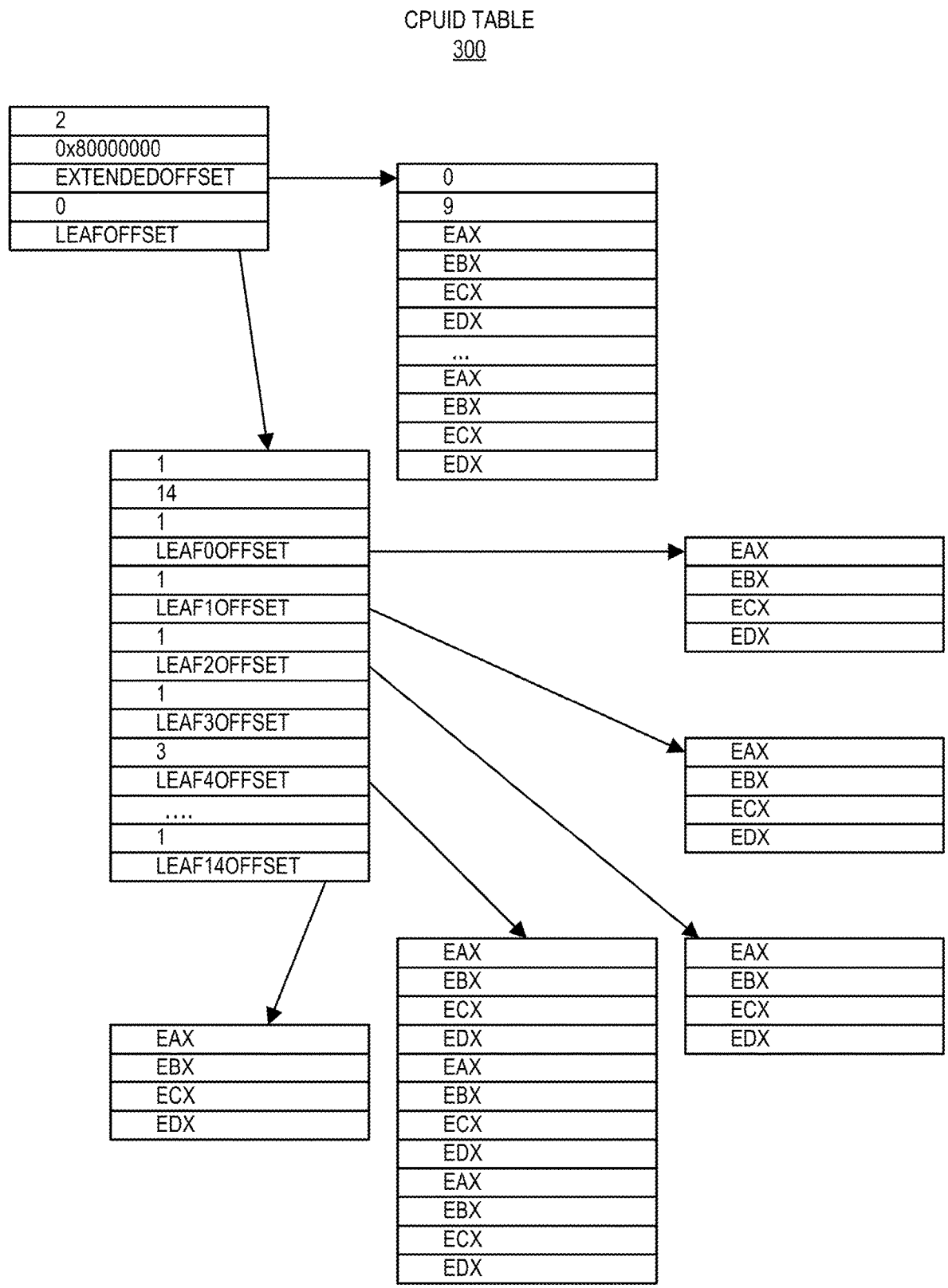
FIG. 3 is a diagram illustrating a processor identification instruction spoofing table according to an embodiment of the invention.

FIG. 3 is an illustration of a CPUID table 300 according to an embodiment of the invention. As shown in FIG. 3, a CPUID table may be hierarchical (e.g., a first level may include one or more pointers to ranges for leafs at a second level, each of which may include one or more pointers to ranges for subleafs at a third level). Therefore, leafs may be accessed directly, without walking through the subleafs of a different leaf.

CPUID table 300 shows a range (corresponding to Table 2 above) at a first level, with pointers to two ranges at a second level: a first range (corresponding to Table 3 above) having no subleafs (therefore the top entry, representing a subleaf flag, is '0'), and a second range (corresponding to Table 4 above) leaf having subleafs (therefore the top entry, representing a subleaf flag, is '1'), not all of which are shown.

Embodiments may include support for virtualization. For example, CPUID will not cause a VM exit unless a designated indicator (e.g., bit 30 from Table 1 above) is set to read the native CPUID when a guest is running with CPUID spoofing enabled. To handle this case, the VMM may configure a core (e.g., according to the information shown in Table 6, which may correspond to the VMM CPUID spoofing configuration information introduced above) to determine whether to allow guests to spoof their own CPUID. This CPUID spoofing configuration mechanism may also be used by the VMM itself to avoid CPUID exits even if it does not expose the CPU spoofing feature to the guest. The mechanism may be nested (e.g., CPU spoofing is exposed to and enabled in the guest but attempts to read native CPUID cause a VM exit to the VMM, in which CPU spoofing is also enabled and used).

Furthermore, CPUID spoofing may be used within a nested virtualization architecture. For example, with two layers of virtualization, a root VMM may configure a native CPUID spoofing MSR to control spoofing when it is running (if desired), and/or a VMM CPUID spoofing MSR to control spoofing when an intervening VMM is running in a VM controlled by the root VMM (if desired); the intervening VMM may configure a first virtual native CPUID spoofing MSR to control spoofing when it is running in the VM controlled by the root VMM (if desired), and/or a virtual VMM CPUID spoofing MSR to control spoofing when a guest OS is running in a VM controlled by the intervening VMM (if desired); and the guest OS may configure a second virtual native CPUID spoofing MSR to control spoofing when it is running in the VM controlled by the intervening VMM (if desired).

In an embodiment having nested virtualization, if a guest has not created its own spoofing tables, the intercept will be delivered to the top level VMM directly under the guest; if the guest has configured spoofing tables, then no intercept will be delivered and the guest's spoofing tables will be used.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the

TABLE 6

| MSR | Bit(s) | Description | Values |
|---|---|---|---|
| VMM_User_CPUID_Spoof | 0 | Enable or disable spoofing CPUID in user mode | 0 - disable (report native CPUID information) 1 - enable spoofing |
| VMM_User_CPUID_Spoof | 11:1 | Reserved | |
| VMM_User_CPUID_Spoof | 63:12 | Address of the CPUID User Mode spoofing table | Host Physical |
| VMM_Kernel_CPUID_Spoof | 0 | Enable or disable spoofing CPUID in kernel mode | 0 - disable (report native CPUID information) 1 - enable spoofing |
| VMM_Kernel_CPUID_Spoof | 11:1 | Reserved | |
| VMM_Kernel_CPUID_Spoof | 63:12 | Address of the CPUID Kernel Mode spoofing table | Host Physical Address |

In embodiments, the address of the user mode spoofing table and the kernel mode spoofing table may be the same (e.g., the same spoofing table is used in both modes).

The VMM may configure its own table separately from the guest, thus allowing the VMM to avoid causing VM exits for CPUID instructions.

coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
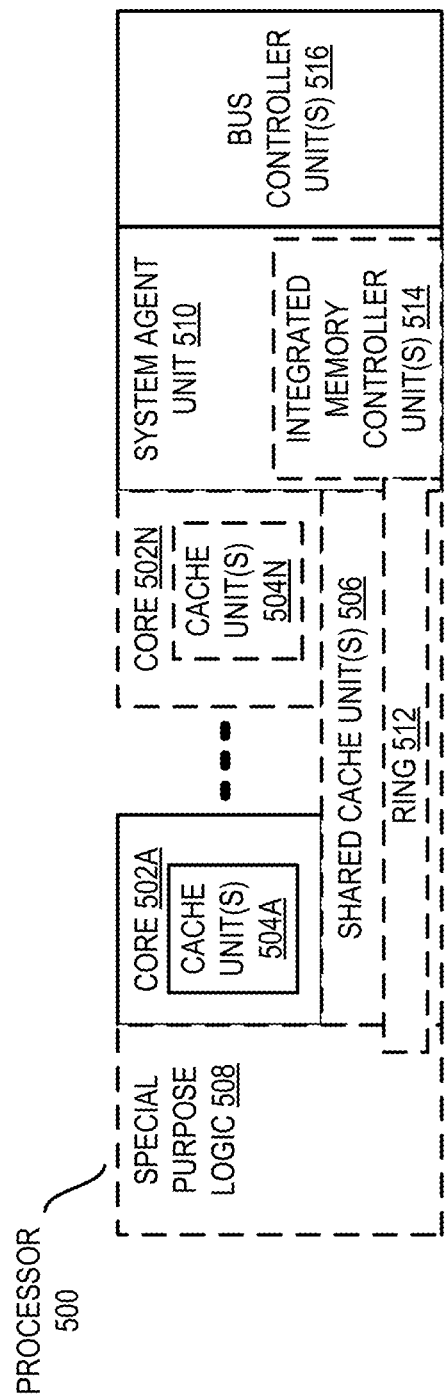
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
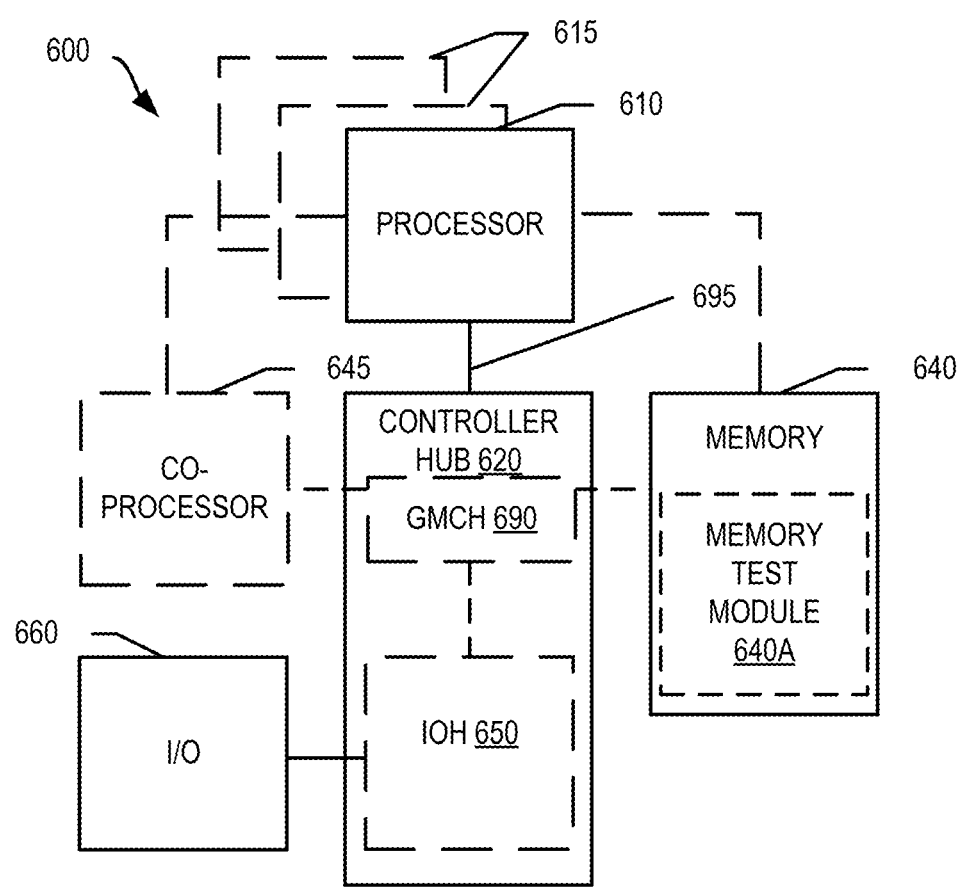
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
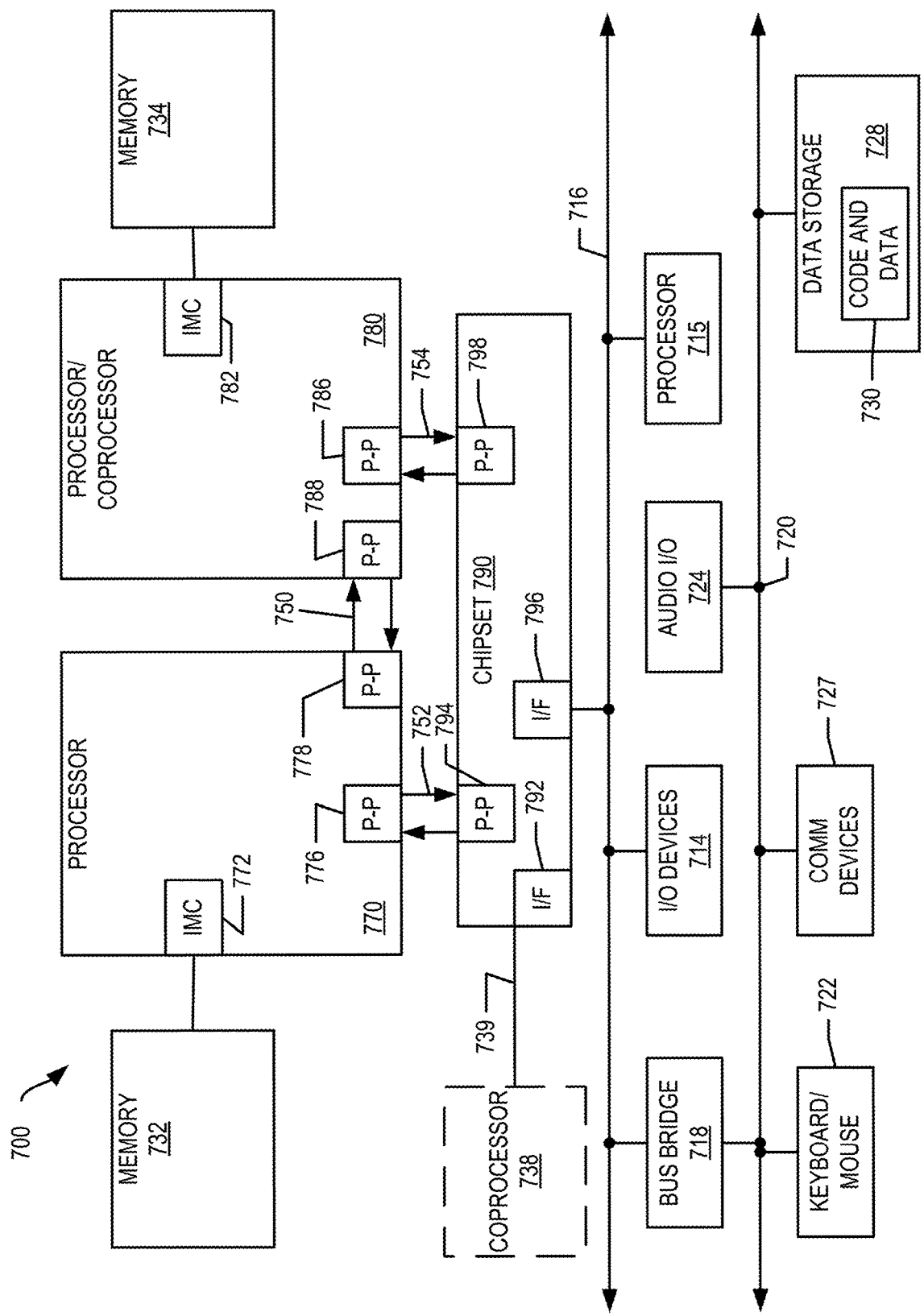
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
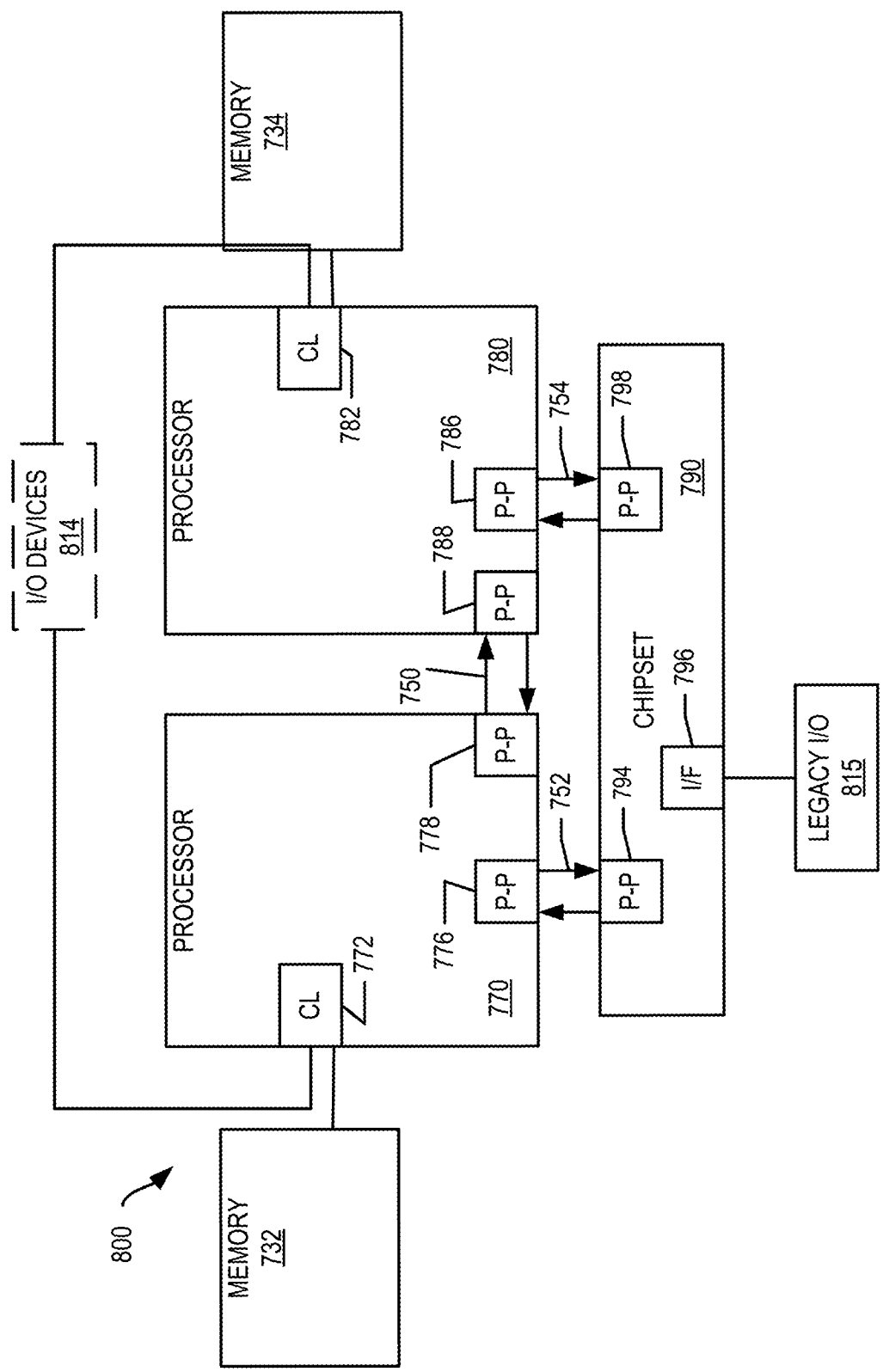
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
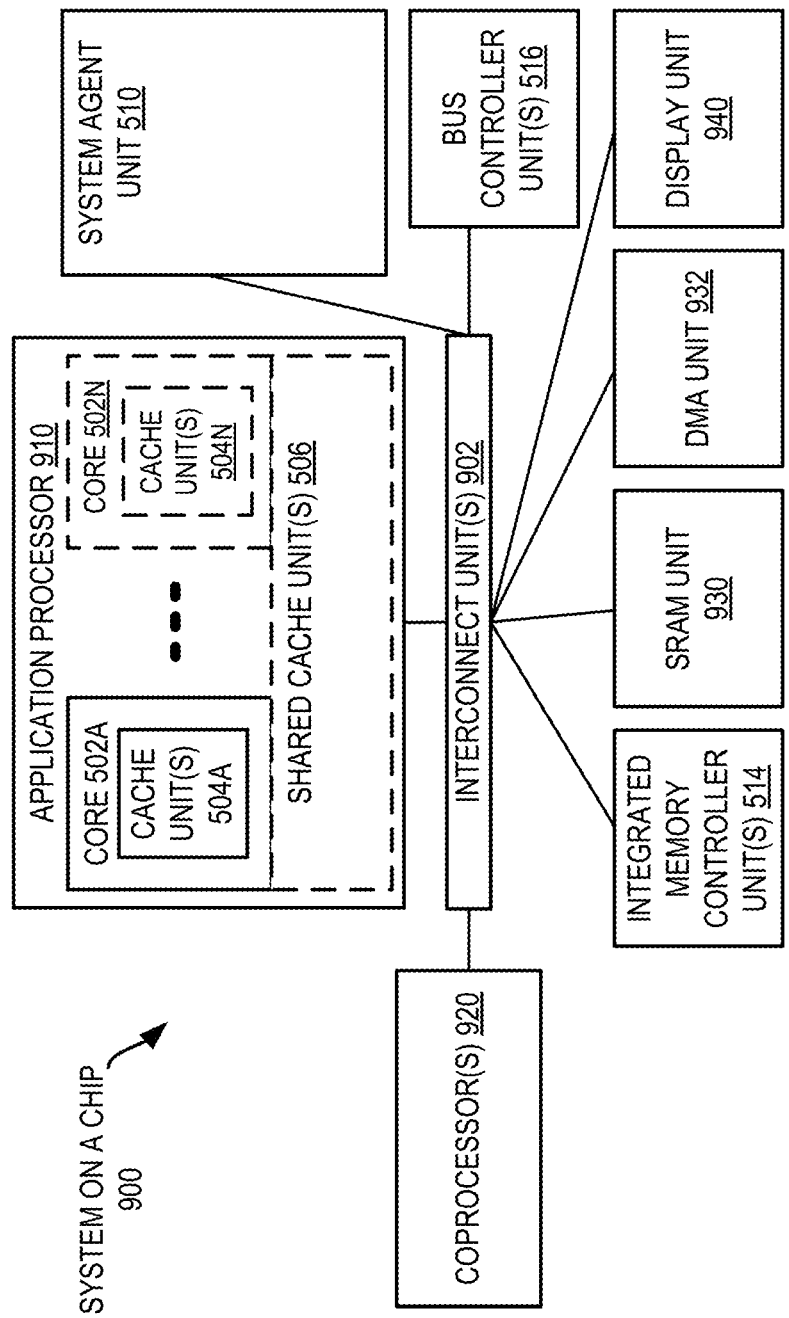
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, a processor includes an instruction decoder and processor identification instruction spoofing logic. The processor identification spoofing logic is to respond to a processor identification instruction by reporting processor identification information from a processor identification spoofing data structure. The processor identification spoofing data structure is to include processor identification information of one or more other processors.

In various embodiments, any or any combination of the following may also apply. The processor identification information to be reported may represent a union of processor identification information of the processor and processor identification information of the one or more other processors. The processor identification information to be reported may be based on a superset of the instruction set architectures of the processor and the one or more other processors. The processor identification information to be reported may represent an intersection of processor identification information of the processor and processor identification information of the one or more other processors. The processor identification information to be reported may be based on a minimum subset of the instruction set architectures of the processor and the one or more other processors. The processor information spoofing data structure may be constructed by an emulation module. The processor information spoofing data structure may be constructed by an operating system. The instruction decoder may also be to decode a second processor identification instruction and the processor, in response to the second processor identification instruction, may report a size of identification information of the processor or to store identification information of the processor to the processor identification spoofing data structure. The second processor identification instruction may specify an address of the processor identification spoofing data structure. The processor may report the size of the identification information of the processor in response to the second processor identification instruction specifying a designated value for the address of the processor identification spoofing data structure.

In an embodiment, a method may include constructing a processor identification spoofing data structure, the processor identification spoofing data structure including processor identification information of a plurality of processors; receiving, by a first processor of the plurality of processors, a first processor identification instruction; and reporting, by the first processor in response to the first processor identification instruction, processor identification information from the processor identification spoofing data structure.

In various method embodiments, any or any combination of the following may also apply. The processor identification information to be reported may represent a union of processor identification of the plurality of processors. The processor identification information to be reported may be based on a superset of the instruction set architectures of the plurality of processors. The processor identification information to be reported may represent an intersection of processor identification of the plurality of processors. The processor identification information to be reported may be based on a minimum subset of the instruction set architectures of the plurality of processors. Constructing the processor information spoofing data structure may be by an operating system using a second processor identification instruction. The method may also include reporting, by the processor in response to the second processor identification instruction, a size of identification information of the processor. The method may also include storing, by the processor in response to the second processor identification instruction, identification information of the processor to the processor identification information data structure.

In embodiments, an apparatus may include means for performing any of the methods described above. In embodiments, a machine-readable tangible medium may store instructions, which, when executed by a machine, cause the machine to perform any of the methods described above.

In an embodiment, a system may include a system memory to store a processor identification spoofing data structure, the processor identification spoofing data structure including processor identification information of a plurality of processors in the system; a first processor of the plurality of processors, the first processor having a first instruction set architecture (ISA); and a second processor of the plurality of processors, the second processor having a second ISA different from the first ISA. The second processor may include an instruction decoder to decode a processor identification instruction; and processor identification instruction spoofing logic to, in response to the processor identification instruction, report processor identification information from the processor identification spoofing data structure.

In system embodiments, as in apparatus and other embodiments, any or any combination of the following may also apply. The processor identification information to be reported represents a union or an intersection of the first ISA and the second ISA. The processor identification information to be reported may represent a union of processor identification information of any combination of processors in the plurality of processors. The processor identification information to be reported may be based on a superset of the instruction set architectures of any combination of processors in the plurality of processors. The processor identification information to be reported may represent an intersection of processor identification information of any combination of processors in the plurality of processors. The processor identification information to be reported may be based on a minimum subset of the instruction set architectures of any combination of processors in the plurality of processors. The processor information spoofing data structure may be constructed by an emulation module. The processor information spoofing data structure may be constructed by an operating system. The instruction decoder may also be to decode an other processor identification instruction and the first processor, in response to the other processor identification instruction, may report a size of identification information of the first processor or to store identification information of the first processor to the processor identification spoofing data structure. The other processor identification instruction may specify an address of the processor identification spoofing data structure. The processor may report the size of the identification information of the first processor in response to the other processor identification instruction specifying a designated value for the address of the processor identification spoofing data structure.

In this specification, operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
    an instruction decoder to decode a first processor identification instruction; and
    processor identification instruction spoofing logic to, in response to the first processor identification instruction, report processor identification information from a processor identification spoofing data structure, the processor identification spoofing data structure to include processor identification information of one or more other processors,
    wherein the processor identification information to be reported represents a union or an intersection of processor identification information of the processor and processor identification information of the one or more other processors.

2. The processor of claim 1, wherein the processor identification information to be reported is based on a superset of the instruction set architectures of the processor and the one or more other processors.

3. The processor of claim 1, wherein the processor identification information to be reported is based on a minimum subset of the instruction set architectures of the processor and the one or more other processors.

4. The processor of claim 1, wherein the processor information spoofing data structure is to be constructed by an emulation module.

5. The processor of claim 1, wherein the processor information spoofing data structure is to be constructed by an operating system.

6. The processor of claim 5, wherein the instruction decoder is also to decode a second processor identification instruction and wherein the processor, in response to the second processor identification instruction, is to report a size of identification information of the processor or to store identification information of the processor to the processor identification spoofing data structure.

7. The processor of claim 6, wherein the second processor identification instruction is to specify an address of the processor identification spoofing data structure.

8. The processor of claim 7, wherein the processor is to report the size of the identification information of the processor in response to the second processor identification instruction specifying a designated value for the address of the processor identification spoofing data structure.

9. A method comprising:
    constructing a processor identification spoofing data structure, the processor identification spoofing data structure including processor identification information of a plurality of processors;
    receiving, by a first processor of the plurality of processors, a first processor identification instruction; and
    reporting, by the first processor in response to the first processor identification instruction, processor identification information from the processor identification spoofing data structure, wherein the processor identification information to be reported represents a union or an intersection of processor identification information of the processor and processor identification information of one or more other processors of the plurality of processors.

10. The method of claim 9, wherein the processor identification information to be reported is based on a superset of the instruction set architectures of the plurality of processors.

11. The method of claim 9, wherein the processor identification information to be reported is based on a minimum subset of the instruction set architectures of the plurality of processors.

12. The method of claim 9, wherein constructing the processor information spoofing data structure is by an operating system using a second processor identification instruction.

13. The method of claim 12, further comprising reporting, by the processor in response to the second processor identification instruction, a size of identification information of the processor.

14. The processor of claim 12, further comprising storing, by the processor in response to the second processor identification instruction, identification information of the processor to the processor identification information data structure.

15. A system comprising:
- a system memory to store a processor identification spoofing data structure, the processor identification spoofing data structure including processor identification information of a plurality of processors in the system;
- a first processor of the plurality of processors, the first processor having a first instruction set architecture (ISA);
- a second processor of the plurality of processors, the second processor having a second ISA different from the first ISA, the second processor including:
- an instruction decoder to decode a processor identification instruction; and
- processor identification instruction spoofing logic to, in response to the processor identification instruction, report processor identification information from the processor identification spoofing data structure, wherein the processor identification information to be reported represents a union or an intersection of processor identification information of the processor and processor identification information of one or more other processors of the plurality of processors.

16. The system of claim 15, wherein the processor identification information to be reported represents a union or an intersection of the first ISA and the second ISA.

* * * * *